US011677554B2

(12) United States Patent
Basile et al.

(10) Patent No.: US 11,677,554 B2
(45) Date of Patent: Jun. 13, 2023

(54) KEY REGISTRATION TRANSPARENCY FOR SECURE MESSAGING (71) Applicant: Apple Inc., Cupertino, CA (US)

(72) Inventors: Bailey E. Basile, Cupertino, CA (US); Keaton F. Mowery, Redwood City, CA (US); Yannick L. Sierra, San Francisco, CA (US); Frederic Jacobs, St. Sulpice (CH); Ryan W. Baker, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 266 days.

(21) Appl. No.: 16/888,157

(22) Filed: May 29, 2020

(65) Prior Publication Data
US 2020/0382297 A1  Dec. 3, 2020

Related U.S. Application Data (60) Provisional application No. 62/856,006, filed on Jun. 1, 2019.

(51) Int. Cl.
H04L 29/06 (2006.01)
H04L 9/30 (2006.01)
(Continued)

(52) U.S. Cl.
CPC ............ *H04L 9/30* (2013.01); *G06F 16/1805* (2019.01); *G06F 16/2246* (2019.01); *H04L 9/0861* (2013.01); *H04L 9/3247* (2013.01)

(58) Field of Classification Search
CPC ....... H04L 9/30; H04L 9/0861; H04L 9/3247; H04L 9/0825; H04L 9/0897; H04L 9/14;
(Continued)

(56) References Cited

U.S. PATENT DOCUMENTS

2013/0061055 A1* 3/2013 Schibuk ................. G06Q 20/40
713/172
2016/0352526 A1* 12/2016 Adler ..................... G06Q 90/00
(Continued)

OTHER PUBLICATIONS

Goldberg et al., "Verifiable Random Functions (VRFs) draft-irtf-cfrg-vrf-04," CFRG, Internet-Draft, Intended status: Standards Track, Feb. 8, 2019, 43 pages.

(Continued)

*Primary Examiner* — Beemnet W Dada
*Assistant Examiner* — Leynna Truvan
(74) *Attorney, Agent, or Firm* — Kowert, Hood, Munyon, Rankin & Goetzel, P.C.; Paul T. Seegers; Dean M. Munyon (57) ABSTRACT Techniques are disclosed relating to secure message exchanges. In some embodiments, a first computing device generates an account key associated with a user account shared by a plurality of computing devices. The first computing device signs a public key of the first computing device with the generated account key to produce a digital signature and sends the public key and the digital signature to a first server system for distributing the public key to a second computing device attempting to send an encrypted message to the first computing device. The first computing device sends the account key to an external storage external usable by others of the plurality of computing devices to obtain the account key and use the account key to sign public keys of the other computing devices. The first computing device receives, from the second computing device, the encrypted message encrypted using the public key.

20 Claims, 6 Drawing Sheets (51) Int. Cl.
   *H04L 9/32* (2006.01)
   *H04L 9/08* (2006.01)
   *G06F 16/22* (2019.01)
   *G06F 16/18* (2019.01)

(58) Field of Classification Search
   CPC .............. H04L 63/0442; H04L 63/062; G06F 16/1805; G06F 16/2246
   See application file for complete search history.

(56) References Cited

U.S. PATENT DOCUMENTS

2018/0123804 A1* 5/2018 Smith ................... H04L 9/0825
2018/0332014 A1* 11/2018 Kravitz .................. H04L 67/10

OTHER PUBLICATIONS

GitHub—google/trillian: A transparent, highly scalable and cryptographically verifiable data store; https://github.com/google/trillian; 11 pages. [Retrieved May 28, 2019].

Melara et al., "CONIKS: Bringing Key Transparency to End Users," Proceedings of the 24th USENIX Security Symposium, Aug. 12-14, 2015, 17 pages.

Server Security, Keybase Docs; https://book.keybase.io/docs/server; 3 pages. [Retrieved May 28, 2019].

Eijdenberg et al., "Verifiable Data Structures," Nov. 2015, 7 pages.

* cited by examiner

KEY REGISTRATION TRANSPARENCY FOR SECURE MESSAGING

The present application claims priority to U.S. Prov. Appl. No. 62/856,006, filed Jun. 1, 2019, which is incorporated by reference herein in its entirety.

BACKGROUND

Technical Field

This disclosure relates generally to computing devices, and, more specifically, to secure message exchanges.

Description of the Related Art

Mobile devices have traditionally allowed users to exchange messages via the short message service (SMS). Because SMS is an insecure protocol, more modern messaging systems have transitioned to using end-to-end encryption to ensure that a person intercepting exchanged messages is unable to review the message contents. To facilitate this cryptographic exchange, some messaging systems use a registration service that allows a given mobile device to register device contact information, which can include cryptographic information (e.g., a public key) for establishing a cryptographic exchange with the mobile device. Thus, if a first user wants to send a message to a second user, the first user's device can contact the service to determine the contact information of the second user's device and use the received cryptographic information to establish a secure connection with the second device.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "server system configured to maintain a database" is intended to cover, for example, a computer that has circuitry (e.g., processor, memory, etc.) that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, a user may own a first mobile device and a second mobile device. The term "first" is not limited to the initial device acquired by the user. The term "first" may also be used when only one mobile device exists.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

In some instances, a user may want to use multiple devices to exchange messages with others. For example, a user may initially exchange a set of messages via a phone and then want to continue exchanging messages after the user picks up his or her tablet. In order to appropriately route messages to each of the user's devices, both devices may provide their respective contact information with a registration service, which may associate the provided information with an identity of the user (e.g., a user's phone number). When someone wants to send a message to the user, the sender's device may send a request that identifies the user's phone number to the service and receive the provided information for both the user's devices. Based on this information, the sender's device may then send a copy of the message to both devices. A potential concern, however, is that an unauthorized actor wanting to snoop on the user's communications may attempt to request that the registration service associate another device with the user's identity. Thus, a sender's device may be deceived into sending a copy of the message to both of user's devices as well as the unauthorized actor's device. As will be described below in various embodiments, a message exchanging system may employ one or more techniques to detect and prevent messages from being sent to a device that is registered without a user's permission.

Figure 1:
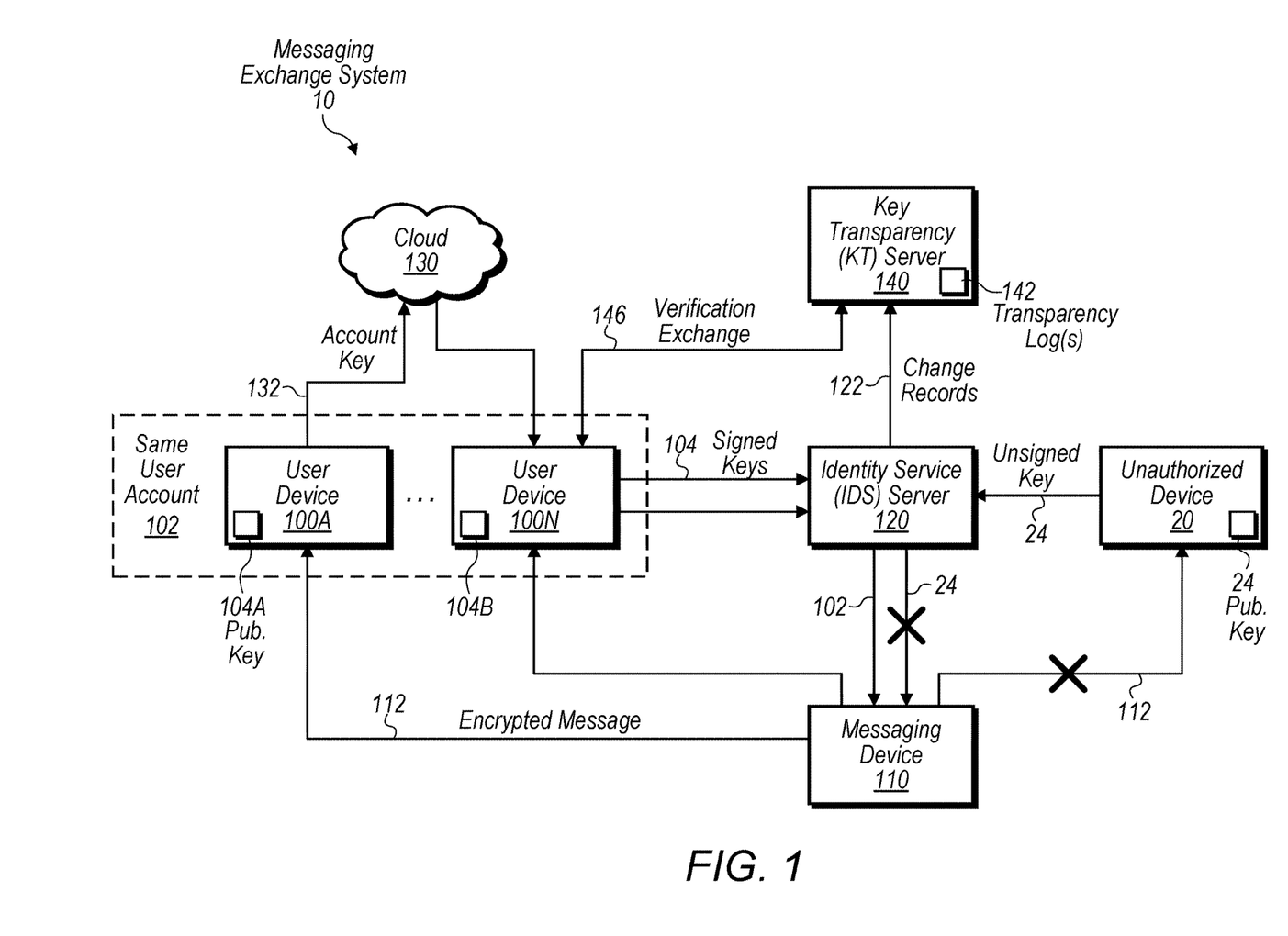
FIG. 1 is a block diagram illustrating an example of a secure message exchanging system.

Turning now to FIG. 1, a block diagram of a messaging exchange system 10 is depicted. In the illustrated embodiment, system 10 includes multiple user devices 100A-N, messaging device 110, identity service (IDS) server 120, cloud 130, and key transparency (KT) server 140. In some embodiments, system 10 may include more (or less) components than shown.

User devices 100, in various embodiments, are computing devices belonging to the same user. Accordingly, in the illustrated embodiment, devices 100 may be registered to the same user account 102 of the user, which may be associated with one or more user identifiers (e.g., a phone number, an email address, etc.) that are usable by others to direct messages 112 to the user. In the illustrated embodiment, each user device 100 is also configured to generate a respective public key pair having a private key (not shown) and a corresponding public key 104 usable to decrypt and encrypt messages 112. As used herein, references to a key being "useable to decrypt/encrypt" include decrypting/encrypting with the key or using the key to derive (or decrypt/encrypt) one or more additional keys that are used to decrypt/encrypt data. For example, in some embodiments, when receiving an encrypted message 112, a given device 100 may receive a symmetric key encrypted with its public key 104, decrypt the symmetric key with its private key, and then use the symmetric key to decrypt the encrypted message 112. In another embodiment, devices 100 and 110 may use respectively generated public key pairs to perform a mutually authenticated key exchange to establish a shared symmetric key such an Elliptic-curve Diffie-Hellman (ECDH) key exchange. In the illustrated embodiment, devices 100 exchange public keys 104 with other devices, such as messaging device 110, via IDS server 120.

IDS server 120, in various embodiments, is a server system configured to maintain a database of contact information usable to facilitate the exchange of encrypted messages 112. In some embodiments, the contact information maintained for a given user account 102 may include one or more user identifiers (e.g., email addresses, phone numbers, etc.) for contacting a user, one or more device identifiers (e.g., internet protocol (IP) addresses, universal resource indicators (URIs), etc.) for routing messages to specific devices, and the public keys of those devices for exchanging encrypted messages 112. Accordingly, when a given device 100 is added to user account 102, the device 100 may contact server 120 to register its device identifier and public key 104 to have them associated with the user account 102. When another user of a messaging device 110 later wants to send a message 112 to the user of devices 100, device 110 may send an information request identifying one of the user identifiers to server 120 and receive a corresponding list of device identifiers for registered devices 100 and their corresponding public keys 104. In the illustrated embodiment, device 110 can then send a respective copy of message 112 addressed to each device identifier and encrypted using each device 100's respective public key 104.

As noted above, however, an unauthorized actor may attempt to have IDS server 120 register an unauthorized device 20 with user account 102 in an attempt to deceive messaging device 110 into sending a message 112 to unauthorized device 20. As will be discussed below in various embodiments, system 10 may use cloud 130 and KT server 140 (along with devices 100 and/or 110) to thwart this attack.

Cloud 130, in various embodiments, is a computer cluster configured to provide various services to devices 100 including the storage and synchronization of data between devices 100. In the illustrated embodiment, devices 100 use cloud 130 to exchange a private key (shown as account key 132) among one another. This account key 132 may then be used by devices 100 to sign their respective public keys 104 before they are provided to server 120. In other embodiments, account key 132 may be a symmetric key that is used to be produce a signed hash (e.g., an HMAC) that can be used to verify public keys 104. In various embodiments, account key 132 is protected by another cryptographic key (not shown) that is held only by devices 100 and is provided to a new device 100 only after explicit authorization by the user via the user interface of one of devices 100. As such, unauthorized device 20 may not be able to obtain account key 132 and use it to generate the appropriate signature for its public key 24. In some embodiments, IDS server 120 may refuse to accept an unsigned key 24 if no signature is present or if server 120 is unable to confirm that a signature of key 24 is produced by account key 132. In other embodiments, however, signature verification may be performed by devices 100 and/or messaging device 110. For example, messaging device 110 may initially send, to devices 100, a list of public keys 104 and their corresponding signatures, and devices 100 may notify the users of devices 100 and 110 if any of the signatures are determined to be invalid (i.e., determined not to have originated from account key 132). Alternatively, devices 100 may send the public key corresponding to account key 132, and messaging device 110 may use the public key to validate the signatures received from IDS server 120. In some embodiments, public keys 104 and account key 132 are also periodically rolled/updated to prevent older keys 104 from being used.

KT server 140, in various embodiments, is configured to log the actions performed by IDS server 120 when server 120 registers devices. Accordingly, KT server 140 may receive change records 122 as information is updated by IDS server 120 and may store these records 122 in one or more transparency logs 142. As will be described in greater detail below with FIGS. 2 and 3, logs 142 may be append-only logs that use cryptographic chaining to make the stored information immutable. In the illustrated embodiment, user devices 100 (and/or device 110) may perform a verification exchange 146 with KT server 140 to confirm that the set of public keys 104 being provided by IDS server 120 is consistent with the set of valid public keys 104 noted in logs 142 and is consistent with the set of public keys 104 known to devices 100. If an inconsistency is found, devices 100 and/or device 110 may report the inconsistency to the users of devices 100 and 110. In some embodiments, each device 100 may store its public key in cloud 130 so that each other device 100 can be aware of the set of keys 104 believed to be valid by devices 100.

Figure 2:
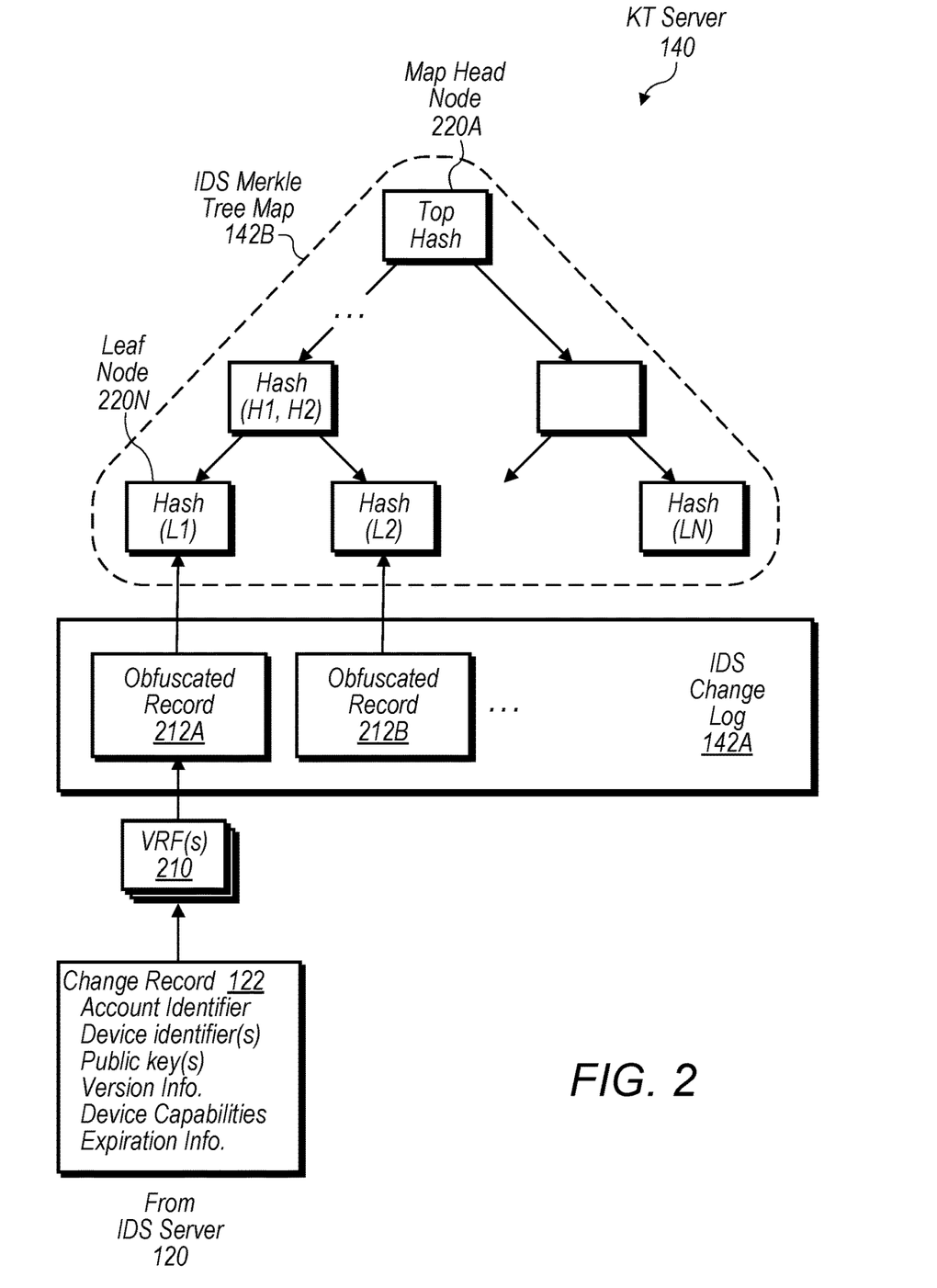
FIGS. 2 and 3 are block diagrams illustrating examples of logs maintained by a key transparency server in the secure message exchanging system.

Turning now to FIG. 2, a block diagram of two transparency logs 142 maintained by KT server 140 is depicted. As noted above, in various embodiments, KT server 140 may use one or more append-only transparency logs 142 to track updates being made by IDS server 120. In the illustrated embodiment, KT server 140 implements an append-only log using a Merkle tree; however, in other embodiments, other forms of append-only logs may be used such as a block chain, etc.

As shown in FIG. 2, KT server 140 may receive a change record 122 corresponding to an update made by IDS server 120. In the illustrated embodiment, change record 122 includes an account identifier for user account 102, device identifiers for routing messages 112 to devices 100, public keys 104, version information corresponding to a version of a messaging application used by devices 100, device capabilities, and expiration information identifying when public keys 104 expire; however, in other embodiments, record 122 may include more (or less) information. In various embodiments, the device capabilities included in a record 122 allow another device, such as messaging device 110, to know what is supported by a user device 100. This knowledge may allow the prevention of a downgrade attack in which an unauthorized device attempts to force usage of capabilities associated security protocols or features known to have potential vulnerabilities. In order to prevent contents of records 122 from being reviewed in an unauthorized manner, KT server 140 may apply one or more verifiable random functions (VRF) 210 to components of change record 122 to produce an obfuscated record 212 that can still be subsequently verified.

In some embodiments, obfuscated records 212 may form an IDS change log 142A, which is made immutable using a Merkle tree shown as IDS Merkle-tree map 142B. Accordingly, as obfuscated records 212 are appended to IDS change log 142A, a corresponding leaf node 220 may be appended to map 142B by applying a hash function (e.g., SHA-256) to the record 212A. For example, obfuscated record 212A (abbreviated as L1 in map 142B) may be hashed to produce leaf node 220N including a hash value shown as H1. Similarly, obfuscated record 212B (abbreviated as L2 in map 142B) may be hashed to produce another sibling leaf node 220 including a hash value H2. As leaf nodes 220 are appended to map 142B, the hash values (e.g., H1 and H2) in sibling nodes 220 may be concatenated and then hashed to produce the hash value included in the parent node 220. This process may continue until a map head node 220A is produced, which is dependent on all the hash values in lower nodes 220. If the integrity of a record 212 is later questioned, its integrity can be verified by verifying the hash values along the path from its corresponding leaf node 220 to the map head node 220A and the hash values in the corresponding sibling nodes 220 of those nodes 220 residing along the path.

Figure 3:
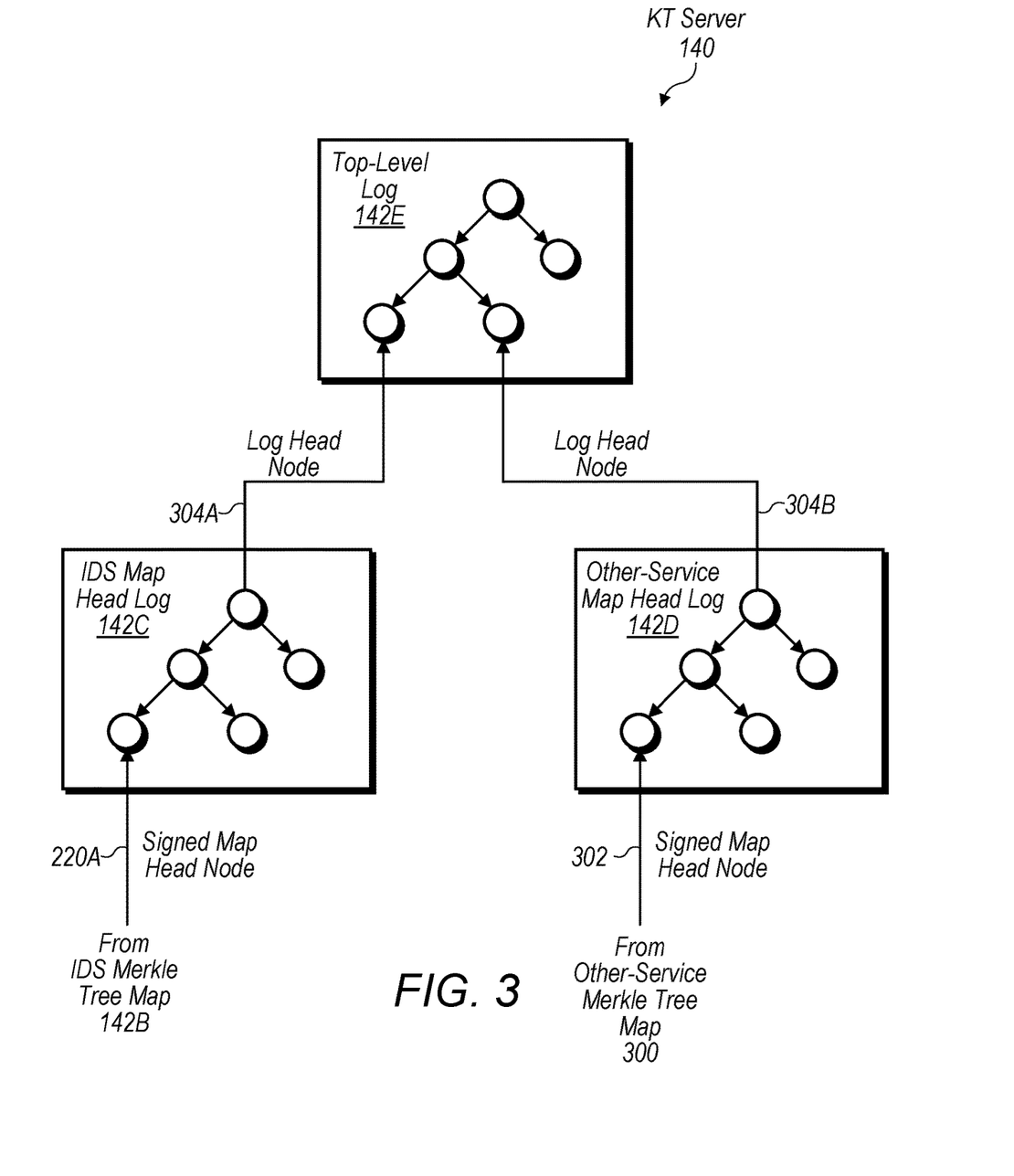

Turning now to FIG. 3, a block diagram of three additional transparency logs 142 that may be maintained by KT server 140 is depicted. As nodes 220 are appended to IDS Merkle tree map 142B, map head node 220A may change as it is supplanted by additional parent nodes 220. In various embodiments, KT server 140 may track the values of head nodes 220A by signing them with a private key maintained by KT server 140 and storing them in another append-only log shown as IDS map head log 142C. In the illustrated embodiment, this log 142C includes another Merkle tree; however, in other embodiments, log 142C may be use a different data structure. In some embodiments, KT server 140 may track information associated with another service (or multiple other services) in an additional map 300, which may use a Merkle tree. As such, KT server 140 may track the changing head nodes 302 of this map 300 in a similar other service map head log 142D. The head nodes 302A and 302B of these logs 142C and 142D may then be tracked in a top-level log 142E. In the illustrated embodiment, logs 142D and 142E include additional Merkle trees, which may be implemented in a similar manner as discussed above with respect to FIG. 2; however, in other embodiments, logs 142D and 142E may use different data structures.

Figure 4A:
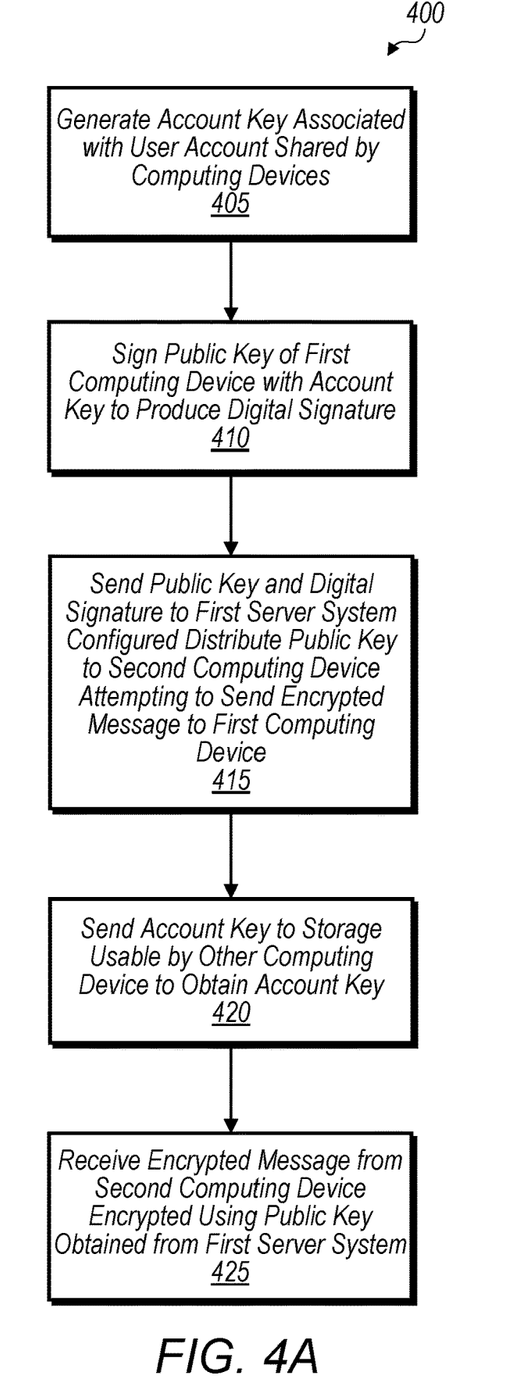
FIGS. 4A-4C are flow diagrams illustrating examples of methods performed by components of the secure message exchanging system.

Turning now to FIG. 4A, a flow diagram of a method 400 is depicted. Method 400 is one embodiment of a method that may be performed by a first computing device receiving messages such as a user device 100. In many instances, performance of method 400 may improve the security of a message exchange with the first computing device.

In step 405, the first computing device generates an account key (e.g., account key 132) associated with a user account (e.g., user account 102) shared by a plurality of computing devices (e.g., user devices 100A-N) including the first computing device.

In step 410, the first computing device signs a public key (e.g. public key 104) of the first computing device with the generated account key to produce a digital signature usable to verify the public key.

In step 415, the first computing device sends the public key and the digital signature to a first server system (e.g., IDS server 120) configured to distribute the public key to a second computing device (e.g., messaging device 110) attempting to send an encrypted message (e.g., encrypted message 112) to the first computing device.

In step 420, the first computing device sends the account key to a storage (e.g., cloud 130) external to the first computing device, the storage being usable by others of the plurality of computing devices sharing the user account to obtain the account key and use the account key to sign public keys of the other computing devices.

In step 425, the first computing device receives the encrypted message from the second computing device, the message being encrypted by the second computing device using the public key obtained from the first server system.

Figure 4B:
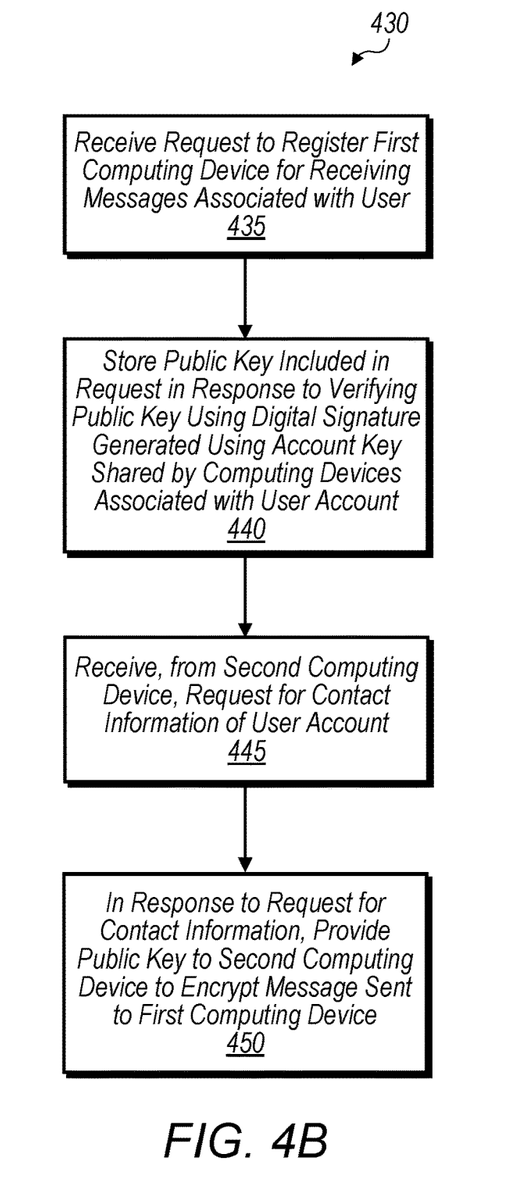

Turning now to FIG. 4B, a flow diagram of a method 430 is depicted. Method 430 is one embodiment of a method that may be performed by a first server system facilitating a message exchange between computing devices such as IDS sever 120. In many instances, performance of method 400 may improve the security of a message exchange between the computing devices.

In step 435, the first server system receives a request to register a first computing device (e.g., a user device 100) for receiving messages (e.g., messages 112) associated with a user account (e.g., user account 102). In various embodiments, the request includes a public key (e.g., signed public key 104) and a digital signature generated from the public key using an account key (e.g., account key 132) shared by a plurality of computing devices associated with the user account including the first computing device.

In step 440, the first server system stores the public key in response to verifying the public key using the digital signature.

In step 445, the first server system receives, from a second computing device (e.g., messaging device 110), a request for contact information of the user account.

In step 450, in response to the request for contact information, the first server system provides the public key to the second computing device. In various embodiments, the public key is usable to encrypt a message (e.g., encrypted message 112) sent from the second computing device to the first computing device.

Figure 4C:
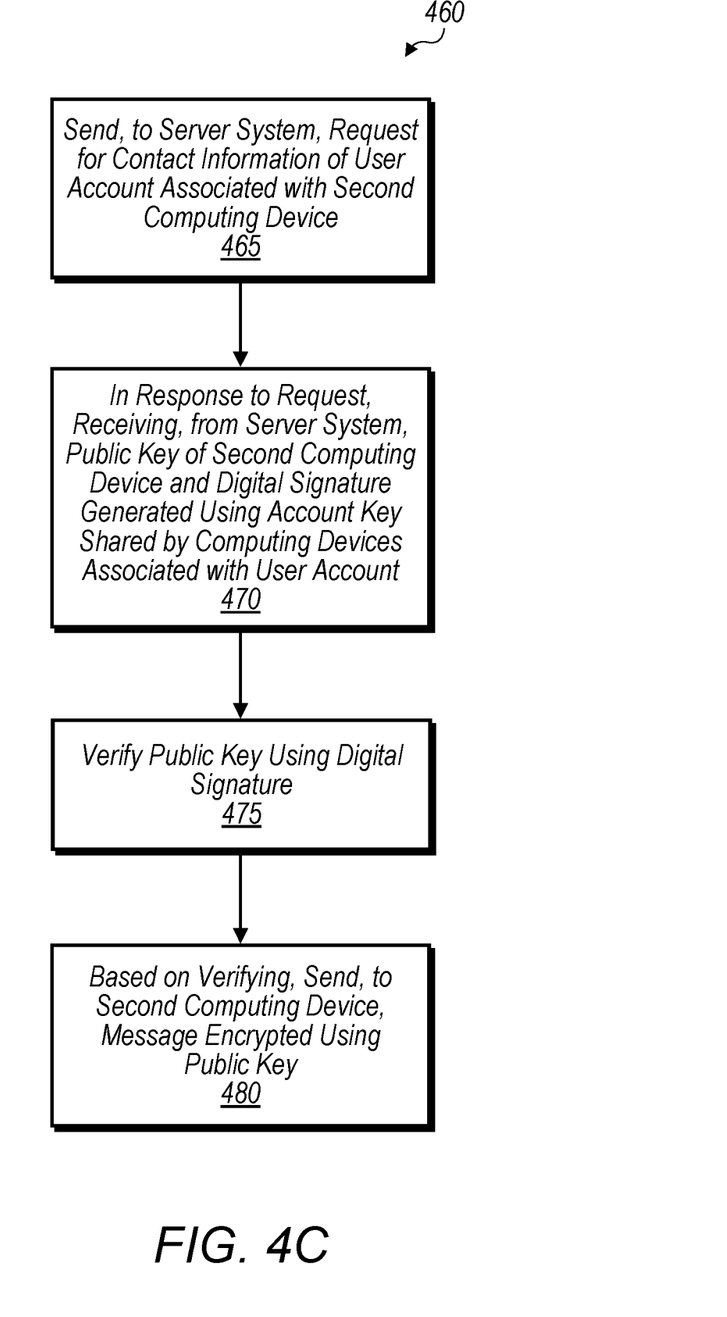

Turning now to FIG. 4C, a flow diagram of a method 460 is depicted. Method 460 is one embodiment of a method that may be performed by a first computing device sending messages such as messaging device 110. In many instances, performance of method 460 may improve the security of a message exchange between the computing devices.

In step 465, the first computing device sends, to a server system (e.g., IDS server 120), a request for contact information of a user account (e.g., user account 102) associated with a second computing device (e.g., a user device 100).

In step 470, in response to the request, the first computing device receives, from the server system, a public key (e.g., a public key 104) of the second computing device and a digital signature generated from the public key using an account key (e.g., account key 132) shared by a plurality of computing devices associated with the user account including the second computing device.

In step 475, the first computing device verifies the public key using the digital signature.

In step 480, based on the verifying, the first computing device sends, to the second computing device, a message (e.g., encrypted message 112) encrypted using the public key.

Exemplary Computer System

Figure 5:
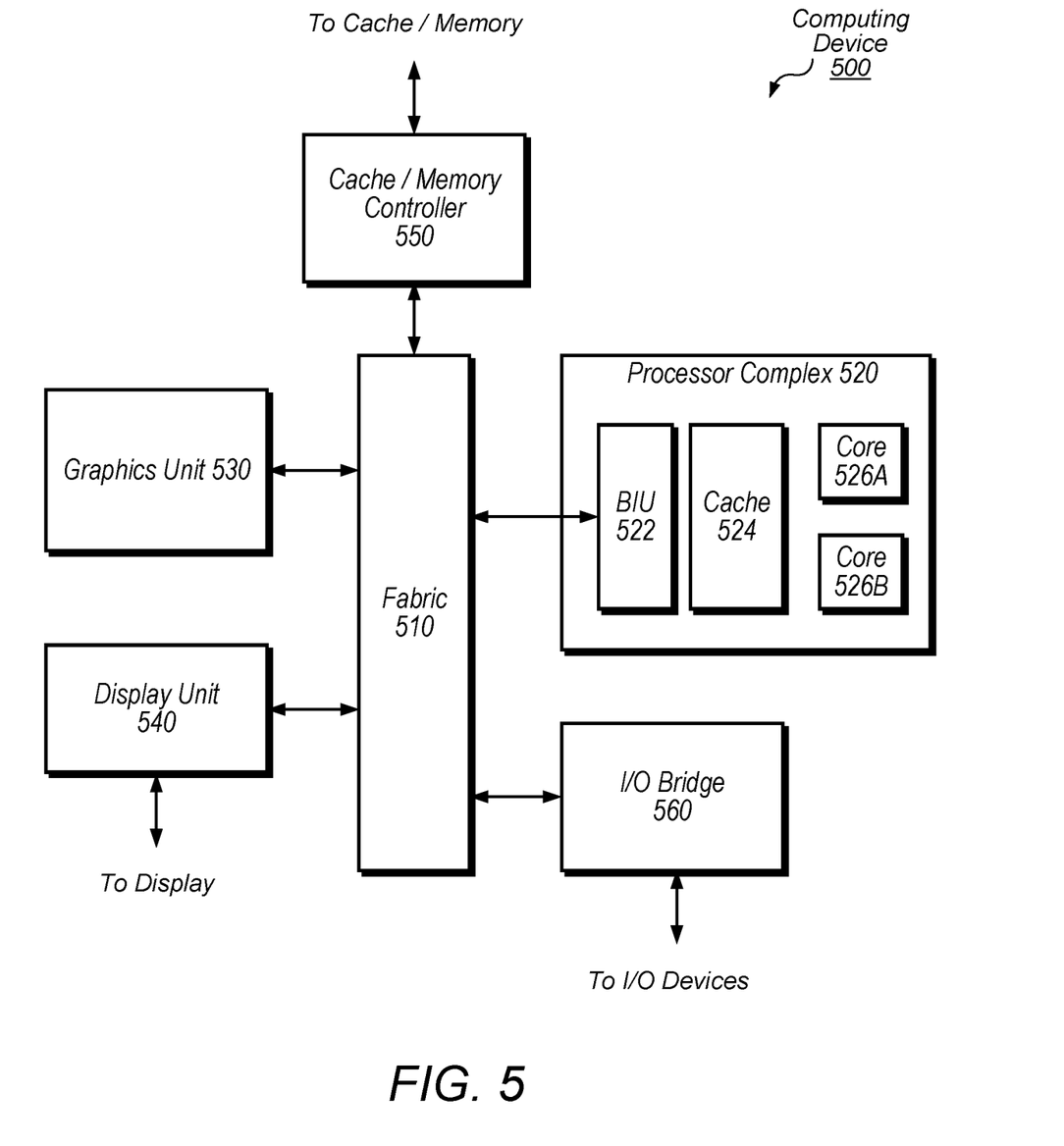
FIG. 5 is a block diagram illustrating one embodiment of an exemplary computer system.

Turning now to FIG. 5, a block diagram illustrating an exemplary embodiment of a computing device 500, which may implement functionality of devices 100, 110, 120, 130, and/or 140, is shown. Device 500 may correspond to any suitable computing device such as a server system, personal computer system, desktop computer, laptop or notebook computer, mainframe computer system, tablet computer, handheld computer, workstation, network computer, a mobile phone, music player, personal data assistant (PDA), wearable device, internet of things (IoT) device, etc. In the illustrated embodiment, device 500 includes fabric 510, processor complex 520, graphics unit 530, display unit 540, cache/memory controller 550, input/output (I/O) bridge 560. In some embodiments, elements of device 500 may be included within a system on a chip (SOC).

Fabric 510 may include various interconnects, buses, MUX's, controllers, etc., and may be configured to facilitate communication between various elements of device 500. In some embodiments, portions of fabric 510 may be configured to implement various different communication protocols. In other embodiments, fabric 510 may implement a single communication protocol and elements coupled to fabric 510 may convert from the single communication protocol to other communication protocols internally. As used herein, the term "coupled to" may indicate one or more connections between elements, and a coupling may include intervening elements. For example, in FIG. 5, graphics unit 530 may be described as "coupled to" a memory through fabric 510 and cache/memory controller 550. In contrast, in the illustrated embodiment of FIG. 5, graphics unit 530 is "directly coupled" to fabric 510 because there are no intervening elements.

In the illustrated embodiment, processor complex 520 includes bus interface unit (BIU) 522, cache 524, and cores 526A and 526B. In various embodiments, processor complex 520 may include various numbers of processors, processor cores and/or caches. For example, processor complex 520 may include 1, 2, or 4 processor cores, or any other suitable number. In one embodiment, cache 524 is a set associative L2 cache. In some embodiments, cores 526A and/or 526B may include internal instruction and/or data caches. In some embodiments, a coherency unit (not shown) in fabric 510, cache 524, or elsewhere in device 500 may be configured to maintain coherency between various caches of device 500. BIU 522 may be configured to manage communication between processor complex 520 and other elements of device 500. Processor cores such as cores 526 may be configured to execute instructions of a particular instruction set architecture (ISA), which may include operating system instructions and user application instructions. These instructions may be stored in computer readable medium such as a memory coupled to memory controller 550 discussed below.

Graphics unit 530 may include one or more processors and/or one or more graphics processing units (GPU's). Graphics unit 530 may receive graphics-oriented instructions, such as OPENGL®, Metal, or DIRECT3D® instructions, for example. Graphics unit 530 may execute specialized GPU instructions or perform other operations based on the received graphics-oriented instructions. Graphics unit 530 may generally be configured to process large blocks of data in parallel and may build images in a frame buffer for output to a display. Graphics unit 530 may include transform, lighting, triangle, and/or rendering engines in one or more graphics processing pipelines. Graphics unit 530 may output pixel information for display images.

Display unit 540 may be configured to read data from a frame buffer and provide a stream of pixel values for display. Display unit 540 may be configured as a display pipeline in some embodiments. Additionally, display unit 540 may be configured to blend multiple frames to produce an output frame. Further, display unit 540 may include one or more interfaces (e.g., MIPI® or embedded display port (eDP)) for coupling to a user display (e.g., a touchscreen or an external display).

Cache/memory controller 550 may be configured to manage transfer of data between fabric 510 and one or more caches and/or memories. For example, cache/memory controller 550 may be coupled to an L3 cache, which may in turn be coupled to a system memory. In other embodiments, cache/memory controller 550 may be directly coupled to a memory. In some embodiments, cache/memory controller 550 may include one or more internal caches. Memory coupled to controller 550 may be any type of volatile memory, such as dynamic random-access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 550 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by processor complex 520 to cause device 500 to perform functionality described herein.

I/O bridge 560 may include various elements configured to implement universal serial bus (USB) communications, security, audio, and/or low-power always-on functionality, for example. I/O bridge 560 may also include interfaces such as pulse-width modulation (PWM), general-purpose input/output (GPIO), serial peripheral interface (SPI), and/or inter-integrated circuit (I2C), for example. Various types of peripherals and devices may be coupled to device 500 via I/O bridge 560. For example, these devices may include various types of wireless communication (e.g., Wi-Fi™, Bluetooth®, cellular, global positioning system, etc.), additional storage (e.g., RAM storage, solid state storage, or disk storage), user interface devices (e.g., keyboard, microphones, speakers, etc.), etc.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer readable medium having program instructions stored therein that are executable by a first computing device to perform operations comprising:
   sending, to a server system, a request for contact information of a user account associated with a plurality of computing devices, wherein the first computing device is not associated with the user account;
   in response to the request, receiving, from the server system, one or more items of the contact information, including:
      a first public key of a second computing device of the plurality of computing devices;
      a first digital signature generated from the first public key using an account key shared by the plurality of computing devices associated with the user account;
      a second public key of a third computing device of the plurality of computing devices; and
      a second digital signature generated from the second public key using the account key;
   verifying the first and second public keys using the first and second digital signatures; and
   based on the verifying, sending encrypted messages to the second and third computing devices, wherein the encrypted messages include:
      a first message, sent to the second computing device, that is encrypted using the first public key; and
      a second message, sent to the third computing device, that is encrypted using the second public key.

2. The computer readable medium of claim 1, wherein using the first public key to encrypt the first message includes:
   using the first public key to establish a symmetric key with the second computing device; and
   encrypting the first message with the symmetric key.

3. The computer readable medium of claim 1, wherein the operations further comprise:
   providing, to the second computing device, the second public key of the third computing device to facilitate a verification performed by the second computing device.

4. The computer readable medium of claim 1, wherein the operations further comprise:
   providing, to the second computing device, the second digital signature of the third computing device to facilitate a verification performed by the second computing device.

5. The computer readable medium of claim 1, wherein the account key is a private key having a corresponding public key, and wherein the verifying includes the first computing device verifying the first digital signature using the corresponding public key.

6. The computer readable medium of claim 1, wherein the account key is a symmetric key, and wherein the verifying includes the first computing device verifying the first digital signature using the account key.

7. The computer readable medium of claim 1, wherein the one or more items of the contact information further include first device information identifying properties of the second computing device, wherein the first device information is usable by the first computing device to determine whether to send the first message to the second computing device.

8. The computer readable medium of claim 7, wherein the first device information indicates a version of a messaging application used by the second computing device to receive the first message.

9. A first computing device, comprising:
   one or more processors;
   memory having program instructions stored therein, wherein the program instructions are executable by the one or more processors to:
      send, to a server system, a request for contact information of a user account associated with a plurality of computing devices, wherein the first computing device is not associated with the user account;
      in response to the request, receive, from the server system, one or more items of the contact information, including:
         a first public key of a second computing device of the plurality of computing devices;
         a first digital signature generated from the first public key using an account key shared by the plurality of computing devices;
         a second public key of a third computing device of the plurality of computing devices; and
         a second digital signature generated from the second public key using the account key;
      verify the first and second public keys using the first and second digital signatures; and
      based on the verifying, send encrypted messages to the second and third computing devices, wherein the encrypted messages include:
         a first message for the second computing device that is encrypted using the first public key; and
         a second message for the third computing device that is encrypted using the second public key.

10. The first computing device of claim 9, wherein the program instructions are further executable by the one or more processors to:
   establish a symmetric key with the second computing device; and
   encrypt the first message with the symmetric key.

11. The first computing device of claim 9, wherein the program instructions are further executable by the one or more processors to:
   send, to the second computing device, the second public key of the third computing device to facilitate a verification performed by the second computing device.

12. The first computing device of claim 9, wherein the program instructions are further executable by the one or more processors to:
send, to the second computing device, the second digital signature of the third computing device to facilitate a verification performed by the second computing device.

13. The first computing device of claim 9, wherein the account key is a private key having a corresponding public key, and wherein the verifying includes the first computing device verifying the first digital signature using the corresponding public key.

14. The first computing device of claim 9, wherein the account key is a symmetric key, and wherein the verifying includes the first computing device verifying the first digital signature using the account key.

15. The first computing device of claim 9, wherein the one or more items of the contact information further include first device information identifying properties of the second computing device, wherein the first device information is usable by the first computing device to determine whether to send the first message to the second computing device.

16. The first computing device of claim 15, wherein the first device information indicates a version of a messaging application used by the second computing device to receive the first message.

17. A method, comprising:
sending, by a first computing device to a server system, a request for contact information of a user account associated with a plurality of computing devices, wherein the first computing device is not associated with the user account;
in response to the request, receiving by the first computing device from the server system, one or more items of the contact information, including:
a first public key of a second computing device of the plurality of computing devices;
a first digital signature generated from the first public key using an account key shared by the plurality of computing devices;
a second public key of a third computing device of the plurality of computing devices; and
a second digital signature generated from the second public key using the account key;
verifying, by the first computing device, the first and second public keys using the first and second digital signatures; and
based on the verifying, sending by the first computing device, encrypted messages to the second and third computing devices, wherein the encrypted messages include:
a first message for the second computing device that is encrypted using the first public key; and
a second message for the third computing device that is encrypted using the second public key.

18. The method of claim 17, further comprising:
using the first public key to establish a symmetric key with the second computing device; and
encrypting the first message with the symmetric key.

19. The method of claim 17, further comprising:
sending, to the second computing device, the second public key of the third computing device to facilitate a verification performed by the second computing device.

20. The method of claim 17, further compromising:
sending, to the second computing device, the second digital signature of the third computing device to facilitate a verification performed by the second computing device.

* * * * *